United States Patent [19]

Gmur

[11] Patent Number: 5,018,648
[45] Date of Patent: May 28, 1991

[54] CYLINDER DISCHARGE

[75] Inventor: Bruno Gmur, Boppartstr, Switzerland

[73] Assignee: Gebruder Buhler AG, Uzwil, Switzerland

[21] Appl. No.: 530,475

[22] Filed: May 29, 1990

Related U.S. Application Data

[63] Continuation of Ser. No. 272,746, Oct. 7, 1988, abandoned.

[30] Foreign Application Priority Data

Dec. 11, 1986 [CH] Switzerland .......... 4930/86

[51] Int. Cl.⁵ .................................... G01F 11/00
[52] U.S. Cl. .......................... 222/272; 222/368
[58] Field of Search .......... 222/269, 272, 271, 274, 222/265, 367, 368

[56] References Cited

U.S. PATENT DOCUMENTS

| | | | |
|---|---|---|---|
| 1,668,324 | 5/1928 | Kreisinger | 222/272 |
| 2,687,244 | 8/1954 | Peterson | 222/272 |
| 2,907,499 | 10/1959 | Agronin | 222/272 |
| 4,154,373 | 5/1979 | Schmidt | 222/272 |

FOREIGN PATENT DOCUMENTS

| | | |
|---|---|---|
| 0108863 | 5/1984 | European Pat. Off. . |
| 2442189 | 3/1976 | Fed. Rep. of Germany . |
| 1402827 | 7/1963 | France . |
| 1402827 | 3/1965 | France . |
| 2482568 | 3/1980 | France . |
| 6403736 | 10/1965 | Netherlands . |

Primary Examiner—Joseph E. Valenza
Assistant Examiner—Kenneth Noland
Attorney, Agent, or Firm—Darby & Darby

[57] ABSTRACT

A two-cylinder discharge for a storage silo for farinaceous bulk goods. The discharge includes a discharge hopper and at least two discharge cylinders which are supported so as to be rotatable in the discharge hopper. The two discharge cylinders include a plurality of discharge chambers arranged in a circumferential direction of the cylinders. A gap exists between the discharge chambers and guide walls of the silo.

10 Claims, 3 Drawing Sheets

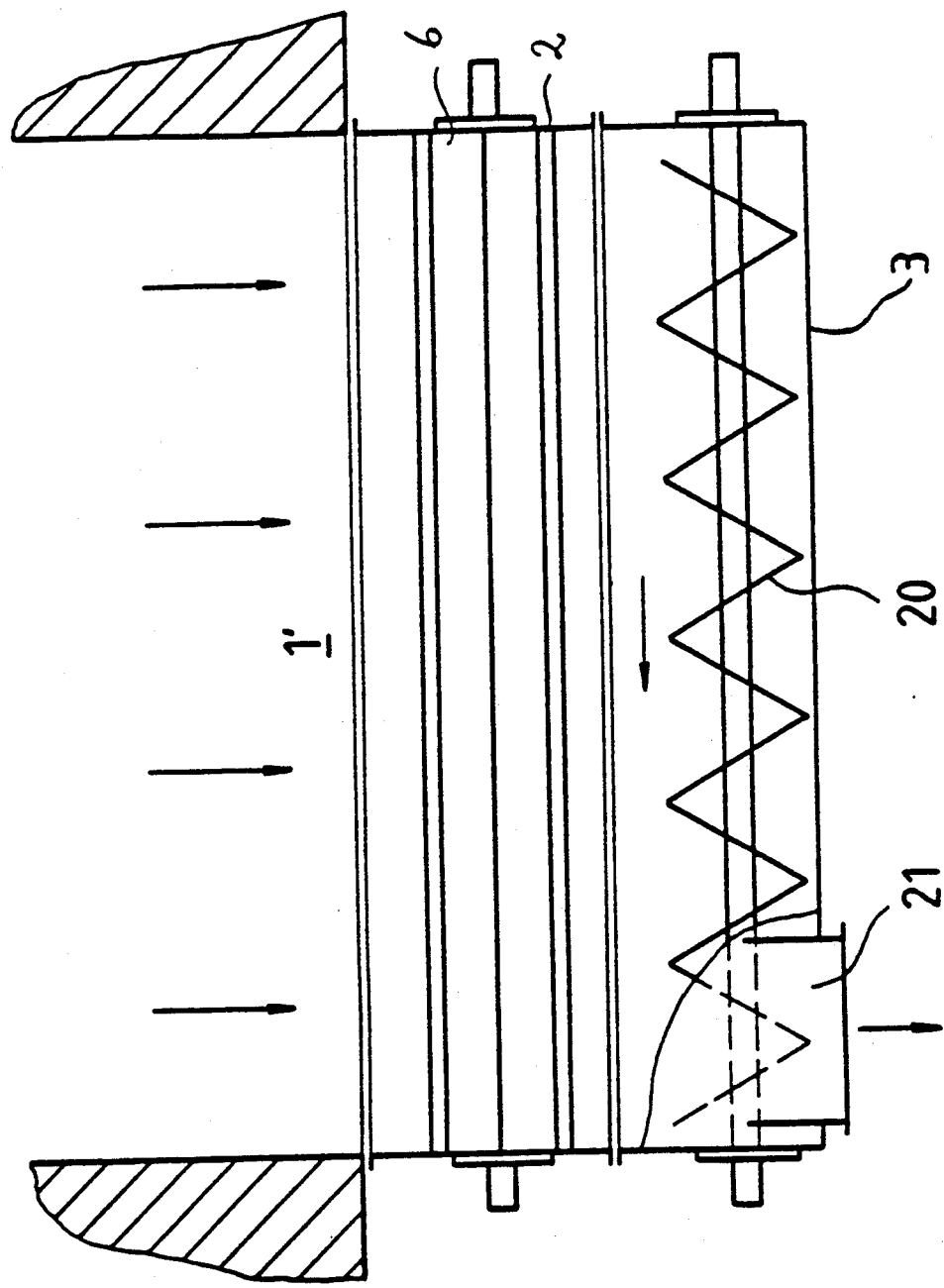

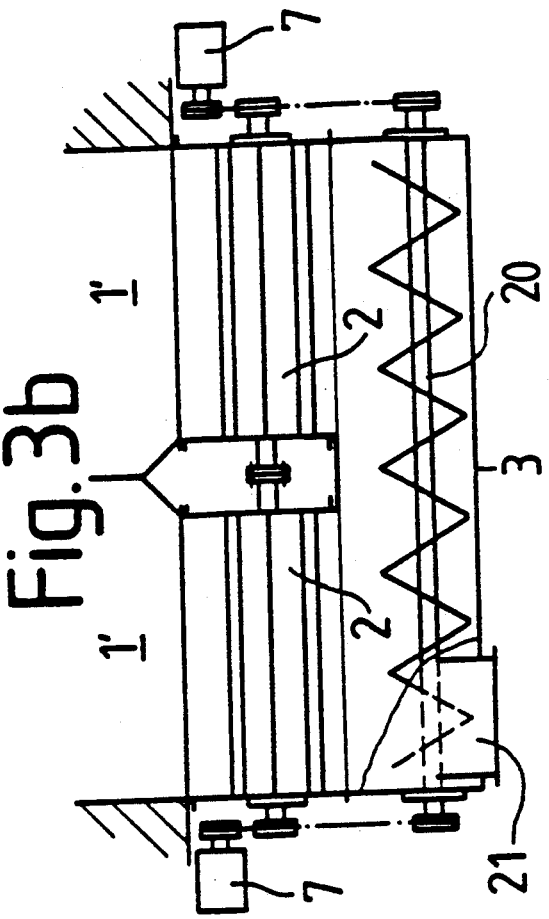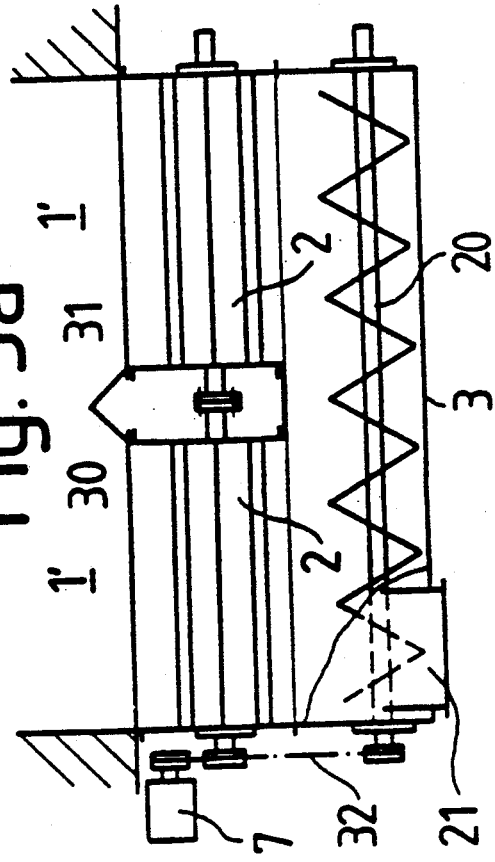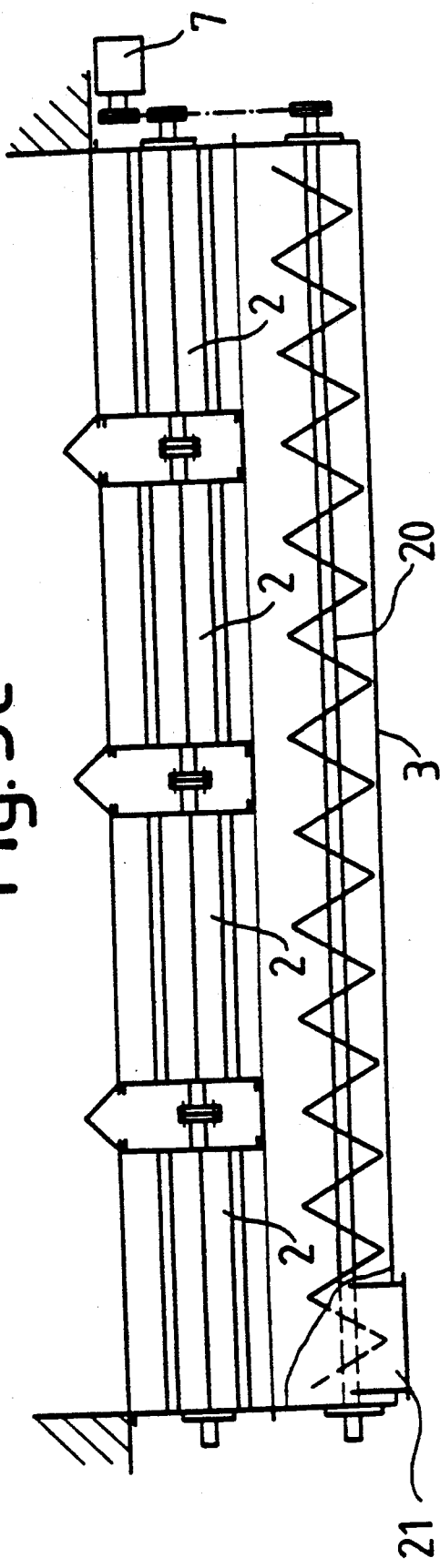

ically a two-cylinder discharge for a storage silo for farinaceous bulk goods, comprising a discharge hopper and at least two discharge cylinders (double-cylinders) which are supported so as to be rotatable in the discharge hopper and comprise a plurality of discharge chambers in the circumferential direction.

CYLINDER DISCHARGE

This is a continuation of application Ser. No. 272,746, filed Oct. 7, 1988 now abandoned.

TECHNICAL FIELD

The invention relates to a cylinder discharge, particularly a two-cylinder discharge for a storage silo for farinaceous bulk goods, comprising a discharge hopper and at least two discharge cylinders (double-cylinders) which are supported so as to be rotatable in the discharge hopper and comprise a plurality of discharge chambers in the circumferential direction.

BACKGROUND ART

When discharging from larger storage silo cells there are three ranges of problems which must be taken into consideration particularly: the reliable discharging of the product, the metering, and the elimination of any disturbance of the flow behavior inside the silo. Throttle cross-sections, for example, with or without adjustable slides, corresponding approximately to the outlet design of liquid containing tanks, are sufficient for free-flowing and fluid goods.

Farinaceous goods are a special case, since the flour flows down and out without help in the manner of a thick-flowing mass when the silo-outlet cross-sections are correctly designed. Should any disturbance occur in the free outlet area or should a favorable flow-out zone occur, this usually results in a corresponding one-sided emptying of the entire silo volume due to the supporting forces of the bulk goods particles. The silo is emptied in a chimney-like manner via the preferred flow-off cross-section. This results in longer storage times for the remaining stored goods and, in foodstuffs, is often the reason for a reduction in quality of the goods and can lead in extreme cases to the decay of the foodstuff.

Discharge cylinders have been used for many decades for the metered discharging of flour from large storage boxes. The very widespread use of discharge cylinders during the past decade is proof that the three ranges of problems formulated in the beginning could be solved with them, at least in principle. The discharge cylinders can be manufactured in considerable lengths. Usually, it was not necessary to taper the silo outlet area in the longitudinal direction of the discharge cylinders. Disturbances or the danger of a one-sided flowing out, respectively, have been countered in recent years by installing unloading bodies, unloading saddles, etc. inside the silo.

An embodiment example for such a solution is shown in the GB-PS No. 788 797. In this case, two discharge cylinders or a double-cylinder pair, respectively, are installed inside a discharge hopper which is fastenable at a lower part of the silo. The silo body comprises a conically reduced outlet, an unloading saddle being arranged in its upper part. The unloading saddle, which is arranged in the middle, above the discharge cylinders, forces the product onto two lateral flow-out zones. It is interesting to note in this solution that the conically reduced outlet in the discharge hopper is continued until slightly above the two discharge cylinders in a stepwise manner. However, the concrete solution, as shown in the GB-PS No. 788 797, would not be suitable for the discharge of flour from storage silos, since flour can often adopt the flow behavior of water, because the flour is fluidizable to a considerable extent. A known device for discharging flour, from a silo cell is described in the DE-OS No. 1 456 692, but comprises only one discharge cylinder. The lower part of the silo was also given a particular shape in this instance, rounded, inclined side walls and a flow body over the inclined surfaces of the silo outlet. The discharge cylinder completely closes the lower silo outlet opening, so that the quantity of product discharged in each instance is determined by means of the contents of the chambers formed at the circumference of the discharge cylinders, as well as by the rate of rotation of the discharge cylinders. A one-sided discharge from the lower silo discharge area, and accordingly a one-sided downward movement in the silo, can be prevented by means of regularly reversing the direction of rotation. The fundamental disadvantage of the solution according to DE-OS No. 1 456 692 consists in the particular design of the lower portion of the silo required by the teaching according to the invention. This may be a good solution in individual cases, but is not technically applicable in the majority of cases. The silo bodies are often constructed in situ by available specialists. Inferior execution of this work must be taken into account frequently, precisely in those areas where the technical training is not as good. This is why the best inventions frequently fail, half of them being realized in a manufacturing plant under the full supervision of the inventor, while the other half are realized in foreign countries without his supervision. In this way, the solution, according to the invention, is simply not realized completely.

DISCLOSURE OF THE INVENTION

The invention has the object of reducing the deficiencies in the known solutions. In particular, a new cylinder discharge for flour is to be provided, which allows a favorably metered discharge of the flour.

The solution, according to the invention, is characterized in that a funnel-like casing, which is open at the top, is assigned to each discharge cylinder in the cylinder discharge according to the generic type.

Practical tests immediately confirm that the assignment of a funnel-like, upwardly open casing for each of the two discharge cylinders allows the discharge behavior to be controlled in a more optimal fashion in multiple respects, enables in particular a metering with high accuracy, prevents negative effects on the downward movement of the product in the silo, makes the discharge reliable in operation and requires no unloading units inside the silo.

In a particularly advantageous solution the discharge funnel is continued, at the bottom, by means of a trough comprising a collecting conveyor screw in the lowest part or at the lower rounded end of the funnel, respectively, so that both form a conveying hopper, a saddle being arranged in its lower area below the discharge cylinders. The conveying hopper, which is formed jointly by the discharge hopper and conveying trough, resembles a triangle which is rounded on all three corners and has its point at the bottom. The product deflection saddle likewise resembles a triangle, but with its point at the top, and is arranged in the central area of the conveying hopper.

Thus, the device, according to the invention, can be conceived as a structural unit in a manner analogous to the GB-PS No. 788 797 and can also be fastened directly at an existing lower part of the silo. As shown in the following, no unloading bodies arranged over the discharge cylinders in the fixed silo construction are required for the new solution. The only condition is a free mass flow in the silo. The new solution takes over the product mass which descends uniformly from the top and discharges the corresponding quantity of product.

However, the invention still allows a large number of additional advantageous design ideas.

The casing preferably contains, at least approximately, cylinder segments or circle sections, respectively, which are arranged so as to be concentric to the respective discharge cylinder. Since the discharge cylinders are arranged in the discharge hopper, the casing also lies substantially completely in the area of the discharge hopper. A discharge unit, which can be finished in the production plant, is effected by means of the particular construction and shaping of the discharge hopper with discharge cylinder and casing. The manner of operation, tolerances and type of manufacture, etc. can be kept under control by the inventor and unknown negative factors can accordingly be eliminated. The silo outlet need only possess the correct geometric shape and be conceived as a mass flow silo. The new two-cylinder discharge device need then only be screwed on, and the system is ready for operation, according to the invention, with reference to the part.

A very particular advantage consists in that the replacement of an old two-cylinder discharge with a new one can be effected successfully with the solution according to the invention.

In addition, the central parts of the casing, i.e. those located between the two discharge cylinders, are preferably constructed as a saddle, wherein the saddle preferably extends at least along the lower half of the discharge cylinders, as seen along the height, and is arranged approximately in the central area of the conveying hopper.

It is very advisable that the two discharge cylinders comprise enough uniformly distributed longitudinal webs so that at least one web is in a position in which it overlaps the casing on both sides in every position. In this way, flour is prevented from shooting through in an uncontrolled manner. Sufficient running play can be provided between the discharge cylinders and the casing by means of this step in order to simplify production. The inner casing is preferably constructed simultaneously on the product discharge side in the lower part at an inclined position between 30° and 60°. By means of all these steps the flour can be discharged so as to be very accurately metered with only a very slight motor output.

The discharge cylinders preferably comprise carrying elements and longitudinal webs, respectively, which are only effective in the circumferential direction, thus, they do not produce any conveying components in the longitudinal direction of the cylinders. The two double-cylinders preferably form a first discharge unit with their casings, which first discharge unit is fastenable directly at the free lower opening of a storage silo. A second collecting conveyor screw constructional unit with a longitudinal conveying device, preferably a conveying or collecting conveyor screw, respectively, is fastened at the bottom at the first constructional unit, wherein the second constructional unit is provided for delivering the product to a "point".

A drive is preferably assigned to the discharge cylinders which is adjustable with respect to rate of rotation and preferably comprises means for remote control and, in addition, also drives the collecting conveyor screw.

In many cases of application, it is particularly helpful if the cylinders are drivable in opposite directions in such a way that the cylinders rotate toward the saddle from the outside to the inside, as seen from the top, the filling of the discharge chambers, and accordingly the discharging, is predominantly effected in the shifting area.

It is frequently advantageous to drive the two discharge cylinders at different rates of rotation, by means of which a differentiated discharge speed of the stored product is achieved.

Another design idea consists in that every two cylinders are constructed so as to form a discharge unit with the casing in such a way that two or more discharge units are connectable with a common drive in the longitudinal direction of the cylinders, a common conveyor screw being assigned to the latter. In this way, larger silo cells can be constructed with a quantity of discharge basic units and the product can be removed from the respective optimal outlet cross-section in a directed manner and metered corresponding to the discharge.

BRIEF DESCRIPTION OF THE DRAWING

FIG. 2 shows a section II—II of FIG. 1.

FIGS. 3a, 3b, 3c show an example of the application of the new two-cylinder discharge for different silo sizes.

BEST MODE FOR CARRYING OUT THE INVENTION

Figure 1A:
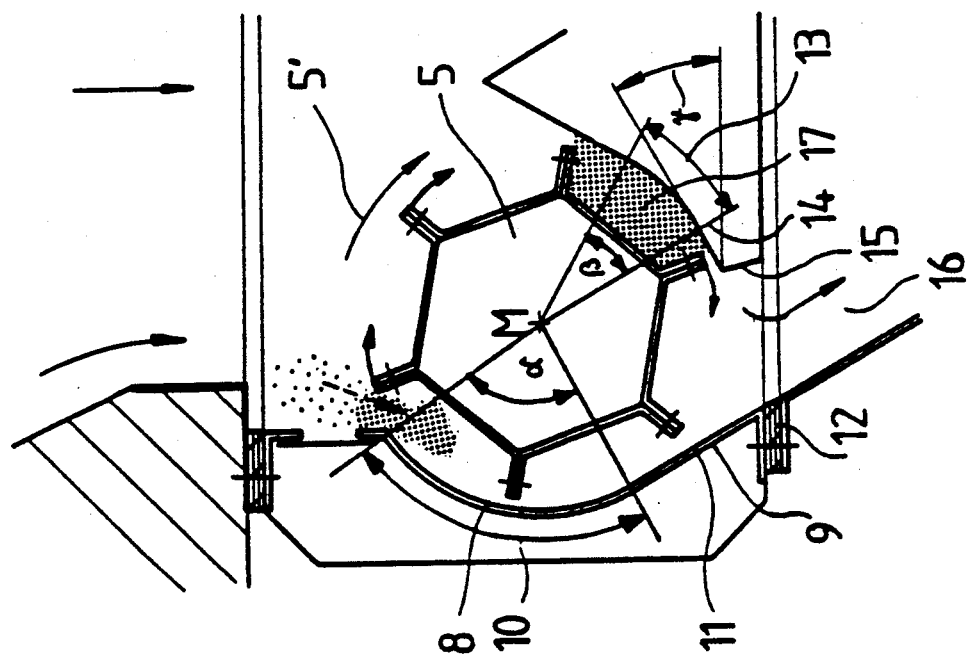
FIG. 1a shows an enlarged section of FIG. 1.

The invention is explained in more detail with the aid of some embodiment examples with additional details with reference to the drawing.

Figure 1:
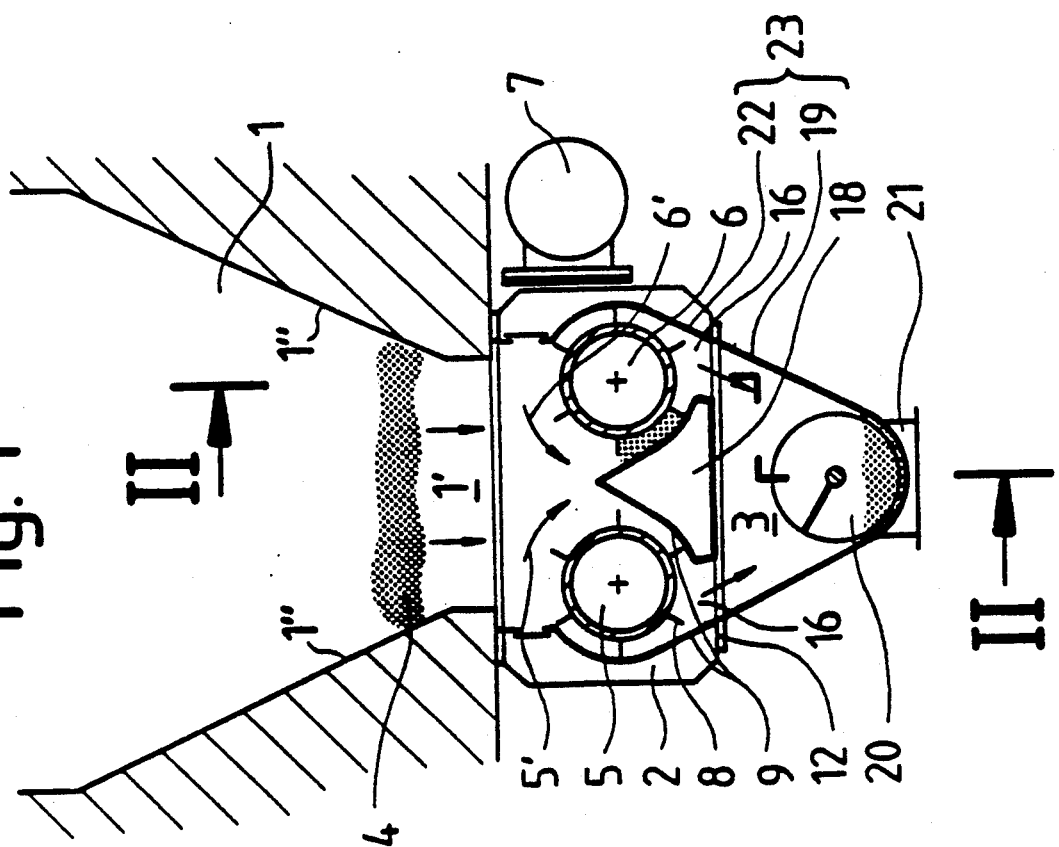
FIG. 1 shows an example of a cross-section of a two-cylinder discharge according to the invention.

Reference is made to FIGS. 1 and 2 in the following.

The funnel-shaped part of a storage silo 1 is shown in the upper part, a two-cylinder discharge device or discharge unit 2, respectively, being flanged on directly at the latter, a collecting conveyor screw constructional unit 3 being screwed on, in turn, at the two-cylinder discharge device or discharge unit 2, respectively. The new two-cylinder discharge is a discharge metering device and, as such, not an auxiliary discharge means. For this reason, it is necessary in normal operation that the stored product descend downward in the silo outlet area as a mass flow. A part of the stored product, which is possibly colored for purposes of demonstration, would move downward in a uniform manner along the entire horizontal surface as indicated with reference number 4. Two discharge cylinders 5 and 6, which are preferably arranged at the same height, are driven in opposite directions, from the outside to the center, by a geared or drive motor 7 so as to discharge, as indicated in arrow 5' and 6', respectively. Both discharge cylinders 5 and 6, respectively, have a quantity—six in the example of FIG. 1—of longitudinal webs at the outer circumference. A funnel-like, upwardly open casing 9 is assigned to each discharge cylinder 5 and 6, respectively. FIG. 1a shows the one discharge cylinder 5 with the casing 9, again in enlarged scale. The outer part of the casing 9 comprises, in the area of an angle α, an approximately circular portion 10 which is arranged so as to be concentric to the center of rotation M of the discharge cylinders 5 and is connected with a flange 12 at the bottom along an outlet inclined surface 11. Likewise, in the area of an angle β, the inner part of the casing 9 comprises a circular portion 13 which is arranged so as to be concentric to the center of rotation M of the discharge cylinder 5 and passes at the bottom into a relatively flatly inclined back-up surface 14. The back-up surface 14 is connected with a closing plate 15 in such a way that a flow-off duct 16 arises between the flow-off inclined surface 11 and the closing plate 15, the stored product being discharged along the entire length of the discharge cylinder 5 and 6, respectively, by means of the latter. As can be seen, a surface area 17, marked in hatching, or, respectively, that volume resulting from the surface area 17 and the entire length of the discharge cylinder 5 and 6, respectively, is discharged during a corresponding rotational movement of the discharge cylinder 5 and 6, respectively. The back-up surface 14 has a twofold function. It has an angle $\gamma$ of 30° to 60° relative to the horizontal line, preferably approximately 40° to 50°, so that a very slight back-up action occurs against the flow-off movement of the stored product at the corresponding place. Accordingly, the flour volume corresponding to a discharge chamber 17 is pushed out at the circumferential speed of the discharge cylinders 5 and 6, respectively. The product can not simply "shoot through". In the absence of the back-up surface 14, there is the danger that the respective volume 17 will empty at a speed which is greater than the circumferential speed of the discharge cylinder 5 and 6, respectively. The disadvantage therein would be a delivery of product in sudden batches. Since the movement of the volume 17 is inhibited, there is the additional possibility of providing a greater play between the longitudinal webs 8 and the casing 9, which allows higher manufacturing tolerances.

As can be seen from FIG. 1, the inner parts of the casing 9 are combined to form a saddle 18, which provides advantages in terms of flow technique, as well as with respect to the strength of the entire discharge unit.

A collecting conveyor screw 20 is arranged in a trough 19 overlapping the two flow-off ducts 16, wherein the collecting conveyor screw 20 feeds the product in the trough 19 to an outlet 21. It can be seen, in addition, from FIG. 2 that the system comprising the two discharge units 2 and a screw discharge constructional unit 3 has the additional advantage that product removed along the entire length of the silo outlet 1' is also mixed uniformly. It can be seen in FIG. 1, in addition, that the outer portions 10 and the outlet inclined surfaces 11 of the casing 9 together form a discharge hopper 22 which, together with the trough 19, forms a closed conveying hopper 23.

FIG. 3a shows the use of the new invention in a relatively long silo outlet 1', so that the latter is provided with two discharge units 2 connected via a coupling 30. A roof 31 is arranged over the connection of the coupling 30 for the purpose of dust-impermeable separation and for protecting the coupling 30. Both discharge units 2 deliver the product into a common trough 19 with a collecting conveyor screw 20 which delivers it through an outlet 21 at a location or a "point", respectively. All three constructional units can be driven by means of a single common drive 7 and an overdrive 32.

In contrast to FIG. 3a, FIG. 3b shows the discharge of flour, but from two separate silo cells. Each discharge unit 2 has its own drive 7, however, only one collecting conveyor screw 20 and screw discharge constructional unit 3, respectively, is assigned to the two discharge units 2 in this instance, as well. Such an arrangement can be seen frequently in storage cells for flour. The ratio of discharge capacity from each storage cell can be adjusted as desired. Accordingly, two flours, e.g. two parts flour of very high quality and one part flour of medium quality, can be discharged and mixed together in the collecting conveyor screw 20.

As a third possibility, FIG. 3c shows a very long silo outlet, under which four discharge units 2 are arranged which comprise a common drive 7, but, also in this instance, only one common collecting conveyor screw 20.

However, it can be seen, accordingly, that, beyond what was previously known, not only is the stored product discharged at a high metering accuracy, but the flow-out behavior in a storage silo can even be influenced directly.

At left in FIG. 1a, the discharge cylinder 5 is shown precisely in a position such that a longitudinal web 8 releases an empty chamber of the discharge cylinder 5 for filling with flour flowing from the top. In this way, by means of the rotational movement in the upper region from left to right, or from the outside to the center in the direction of the saddle 18, a preferred flow zone results in the area of the shiftings 1", so that there is a positive effect on the total flow behavior inside the silo. As is known, it is chiefly the wall friction which has disadvantageous effects on the flow-out behavior. The effect of the wall friction factor, which frequently can be calculated only poorly, is reduced by means of the preferred discharge in the vicinity of the wall, particularly at the inclined shifting 1".

In many cases, precisely in existing storage silo bodies, a one-sided downward movement of the product in the storage silo is often noted. This problem can also be eliminated in the majority of cases by means of a directed selection of the rate of rotation or by means of selecting different rates of rotation of the discharge cylinders 5 and 6, in that the rate of rotation, e.g. of discharge cylinder 5, is reduced on the side at which the product tends to flow out more easily.

In a corresponding manner, each two-cylinder discharge in FIG. 3c can be assigned its own drive motor with a speed which is adjustable in a stepwise manner. In this way, the downward movement of the product can be controlled in a directed manner even in very large storage cell bodies.

I claim:

1. A cylinder discharger for farinaceous bulk goods, comprising:
   a discharger having a top and a bottom which are open, said top being at a higher elevation than said bottom, said discharger having wall portions which are between said top and said bottom;
   two discharge cylinders rotatably supported within said discharger, said discharge cylinders each having an outer circumference, said two discharge cylinders being between said wall portions of said discharger, said wall portions being spaced radially outside of said discharge cylinders;
   a plurality of discharge chambers arranged about the outer circumference of each of said discharge cylinders, said discharge chambers being defined during a portion of rotation of said discharge cylinders by said outer circumference, said wall portions of said discharger, and a plurality of elongated webs which extend along said outer circumference in a direction of elongation of said discharge cylinders and which are spaced apart from each other in a circumferential direction of said cylinders, said discharge chambers being defined during another portion of rotation of said discharge cylinders by said outer circumference, said webs, and respective guide walls between said discharge cylinders; and a trough converging and extending from said bottom of said discharger, said trough having means for conveying the product to an outlet after the product passes through the bottom.

2. Cylinder discharger according to claim 1, the casing contains at least approximately cylinder portions which are arranged concentrically relative to the discharge cylinders respectively.

3. Cylinder discharger according to one of claim 2, wherein the discharge cylinders uniformly distributed comprise said longitudinal webs as said partitions, so that at least one longitudinal web is in an overlapped position with respect to the casing on both sides in every end position of each discharge cylinder.

4. Cylinder discharger according to claim 3, wherein the longitudinal webs of the discharge cylinders comprise a conveying component for conveying the farinaceous bulk goods only in the circumferential direction.

5. Cylinder discharge according to claim 1 wherein the guide walls constitute a saddle which extends at least along a lower portion of the discharge cylinders as viewed from said product entrance side.

6. Cylinder discharger according to claim 1, wherein the casing has central parts which include a back-up surface (14) on the product discharge side, said back-up surface (14) being at an inclined position and arranged relative to said discharge cylinders for inhibiting movement of the goods being carried in said discharge chambers to said product discharge side from said product entrance side.

7. Cylinder discharger according to claim 1, further comprising means for driving said discharge cylinders at an adjustable rate of rotation.

8. Cylinder discharger according to one of claim 1, wherein the discharge cylinders (5, 6) are constructed so as to be drivable in opposite directions.

9. Cylinder discharger according to one of claim 1, wherein the two discharge cylinders are drivable at different rates of rotation for accommodating different rate of discharge of the goods with respect to each of the guide walls.

10. Cylinder discharger according to claim 1, further comprising more than one discharge pair of cylinders, every two discharge cylinders with their respective casing being formed as a discharge unit aligned relative to the rest of the discharge units in a longitudinal direction of the cylinders so that at least two discharge units are connectable with a common drive and are assigned to a common conveyor screw arranged beneath said at least two discharge units.

* * * * *